(12) United States Patent
Takahashi et al.

(10) Patent No.: US 7,936,428 B2
(45) Date of Patent: May 3, 2011

(54) LIQUID CRYSTAL DISPLAY DEVICE WITH AN ELECTRIC-FIELD SHIELDING LAYER AND METHOD OF FABRICATING THE SAME

(75) Inventors: Sounosuke Takahashi, Kanagawa (JP); Mamoru Okamoto, Kanagawa (JP); Shinichi Nishida, Kanagawa (JP)

(73) Assignee: NEC LCD Technologies, Ltd, Kanagawa (JP)

( * ) Notice: Subject to any disclaimer, the term of this patent is extended or adjusted under 35 U.S.C. 154(b) by 557 days.

(21) Appl. No.: 11/065,630

(22) Filed: Feb. 25, 2005

(65) Prior Publication Data

US 2005/0190316 A1 Sep. 1, 2005

(30) Foreign Application Priority Data

Feb. 26, 2004 (JP) ................. 2004-051060

(51) Int. Cl.
*G02F 1/1343* (2006.01)
*G02F 1/136* (2006.01)
*G09G 3/36* (2006.01)
*H01L 29/04* (2006.01)

(52) U.S. Cl. ........ 349/141; 349/142; 349/143; 349/144; 349/42; 349/43; 349/44; 345/92; 257/59; 257/72

(58) Field of Classification Search ............ 349/106, 349/42–55, 114, 141–144; 345/92, 100, 345/104; 257/59, 72
See application file for complete search history.

(56) References Cited

U.S. PATENT DOCUMENTS

| | | | | |
|---|---|---|---|---|
| 5,527,649 A | * | 6/1996 | Sato et al. | 430/7 |
| 5,782,968 A | * | 7/1998 | Hirayama et al. | 106/476 |
| 5,837,374 A | * | 11/1998 | Hirayama et al. | 428/408 |
| 6,449,027 B2 | * | 9/2002 | Lee et al. | 349/141 |
| 6,650,389 B1 | * | 11/2003 | Sakamoto | 349/141 |
| 6,765,634 B2 | * | 7/2004 | Horibe et al. | 349/70 |
| 2001/0045556 A1 | * | 11/2001 | Hirakata et al. | 257/59 |
| 2002/0159016 A1 | * | 10/2002 | Nishida et al. | 349/141 |
| 2004/0008299 A1 | * | 1/2004 | Fujimaki et al. | 349/106 |
| 2004/0027525 A1 | | 2/2004 | Itakura et al. | |
| 2006/0007371 A1 | * | 1/2006 | Miyatake et al. | 349/96 |

FOREIGN PATENT DOCUMENTS

| | | |
|---|---|---|
| CN | 1420386 A | 5/2003 |
| CN | 1448763 A | 10/2003 |
| CN | 1459657 A | 12/2003 |
| JP | 11-24104 A | 1/1999 |
| JP | 11-190860 A | 7/1999 |
| JP | 11-194366 A | 7/1999 |
| JP | 2000-89240 A | 3/2000 |

(Continued)

*Primary Examiner* — Hoan C Nguyen
(74) *Attorney, Agent, or Firm* — Sughrue Mion, PLLC

(57) ABSTRACT

The liquid crystal display device includes a first substrate, a second substrate arranged in facing relation to the first substrate, and a liquid crystal layer sandwiched between the first and second substrates. The first substrate includes a thin film transistor, a pixel electrode associated with a pixel, a common electrode to which a reference voltage is applied, a data line, a scanning line, and a common electrode line. The second substrate is designed to include no electrodes thereon. The first substrate includes an electric-field shielding layer for preventing an electric field from leaking into pixels in which images are to be displayed, from the scanning line, the electric-field shielding layer being comprised of an electrically conductive layer and being formed in a layer located closer to the liquid crystal layer than an area in which the scanning line is arranged.

24 Claims, 10 Drawing Sheets

FOREIGN PATENT DOCUMENTS

| | | |
|---|---|---|
| JP | 3125872 B2 | 3/2000 |
| JP | 2000-186225 A | 7/2000 |
| JP | 2001-183699 A | 7/2001 |
| JP | 2001-305332 A | 10/2001 |
| JP | 2002-323706 A | 11/2002 |
| JP | 2003-295171 A | 10/2003 |
| JP | 2004-62145 A | 2/2004 |
| JP | 2004-163622 A | 6/2004 |
| KR | 2000-0023135 A | 4/2000 |
| KR | 2002-0069168 A | 8/2002 |
| KR | 2003-0078795 A | 10/2003 |

\* cited by examiner

RUBBING DIRECTION

LIQUID CRYSTAL DISPLAY DEVICE WITH AN ELECTRIC-FIELD SHIELDING LAYER AND METHOD OF FABRICATING THE SAME

BACKGROUND OF THE INVENTION

1. Field of the Invention

The invention relates to a liquid crystal display device including two substrates arranged in facing relation to each other, one of which is designed to have no electrodes thereon.

2. Description of the Related Art

An active matrix type liquid crystal display device including a thin film transistor (TFT) as a switch for switching on/off of pixels presents high-quality images, and hence, is used in a lot of products such as a monitor for a desk-top type computer.

In general, a liquid crystal display device operates in either a twisted nematic mode in which liquid crystal molecules having twisted initial orientation are rotated vertically to transparent substrates, a VA mode in which liquid crystal molecules have initial orientation arranged vertical to substrates, or an in-plane switching (IPS) mode in which liquid crystal molecules are rotated in parallel with transparent substrates.

In an in-plane switching (IPS) mode liquid crystal display device, a transparent substrate on which a thin film transistor is fabricated is designed to include pixel electrodes and common electrodes alternately arranged and both having comb-teeth arranged in parallel with each other. By applying a voltage across the pixel and common electrodes, there is generated an electric field in parallel with the substrate. The thus generated electric field changes alignment direction of liquid crystal molecules to thereby control light transmissivity, that is, drive liquid crystal in a plane in parallel with the substrate. Accordingly, an in-plane switching (IPS) mode liquid crystal display device has an advantage that images can be provided with small contrast degradation and small color variance over a wide range of viewing angles, because liquid crystal molecules rotate in a plane in parallel with a substrate.

FIG. 1A is a plan view of a conventional IPS liquid crystal display device, and FIG. 1B is a cross-sectional view taken along the line 1B-1B in FIG. 1A. Hereinbelow, a structure of a conventional IPS liquid crystal display device is explained with reference to FIGS. 1A and 1B.

As illustrated in FIG. 1B, an IPS liquid crystal display device is comprised of an active device substrate 100 on which a thin film transistor (TFT) 5 is fabricated, an opposed substrate 110 on which a color filter is fabricated, and a liquid crystal layer 10 sandwiched between the substrates 100 and 110.

The active device substrate 100 includes a first transparent substrate 1, a common electrode 3, an interlayer insulating film 4, a data line 6, a pixel electrode 7, a passivation film 8, an alignment film 9, and a polarizing plate 16a.

On the first transparent substrate 1 are formed scanning lines 2 and the data lines (signal lines) 6 such that they extend perpendicularly to each other. Thin film transistors 5 are arranged in a matrix at intersections of the scanning lines 2 with the data lines 6. In each of pixels, the pixel electrode 7 and the common electrode 3 are alternately arranged in parallel with each other.

The common electrode 3 is electrically insulated from the pixel electrode 7 and the data line 6 through the interlayer insulating film 4. The passivation film 8 covers the pixel electrode 7 and the data line 6 therewith.

The opposed substrate 11 includes a second transparent substrate 11, a black matrix layer 12 for shielding extra light, color layers 13 for displaying images having red (R), green (G) and blue (B) colors, an overcoat layer 14, an alignment film 9, an electrically conductive layer 15, and a polarizing plate 16b.

Specifically, on the second transparent substrate 11 are formed the black matrix layer 12, the color layers 13 partially covering the black matrix layer 12 therewith, and the overcoat layer 14 entirely covering the black matrix layer 12 and the color layers 13 therewith.

The first and second transparent substrates 1 and 11 are coated at surfaces thereof with the alignment film 9. Liquid crystal molecules in the liquid crystal layer 10 are homogeneously aligned with a certain angle longitudinally of the pixel electrode 7. The first transparent substrate 1 is covered with the polarizing plate 16a, and the second transparent substrate 11 is covered with the polarizing plate 16b with the electrically conductive layer 15 being sandwiched therebetween. The polarizing plates 16a and 16b have polarization axes extending perpendicularly to each other, and one of the polarization axes is designed to extend in parallel with a direction in which liquid crystal molecules in the liquid crystal layer 10 are aligned.

In the above-mentioned IPS liquid crystal display device, a voltage is applied to the pixel electrode 7 through the thin film transistor 5 to thereby apply a horizontal electric field across the pixel electrode 7 and the common electrode 3. As a result, liquid crystal molecules in the liquid crystal layer 10 are twisted in a plane in parallel with the transparent substrates 1 and 11, thereby accomplishing control in displaying images.

A liquid crystal display device has been conventionally used mainly as a monitor of a note-type or desk-top type personal computer, but is presently used in various fields such as a television set and multi-media. With expansion in fields in which a liquid crystal display device is used, a liquid crystal display device is required to have enhanced characteristic of a viewing angle and ability to match wide chromaticity area.

With respect to a device used in a field of television, such as a monitor, there are standardized systems for transmitting image signals. As typical systems, there are National Television System Committee (NTSC) adopted by USA and Japan, and European Broadcasting Union (EBU) adopted by Europe. In order to apply a liquid crystal display device to a television, it is necessary to fabricate a liquid crystal display device to meet with one of the above-mentioned systems.

A liquid crystal display device has been conventionally fabricated so as to meet with NTSC in which a chromaticity area is about 60%. In order for a liquid crystal display device to meet with EBU in which a chromaticity area is wider than NTSC, specifically, about 70% or greater, a liquid crystal display device has to have improved optical characteristics in parts constituting a liquid crystal display device, in particular, in a color filter. To this end, it would be necessary for a liquid crystal display device to include a color filter having optimally arranged pigments.

It is known that a twisted nematic type liquid crystal display device is accompanied with a problem of defectiveness in displaying images, caused by optical characteristics of parts constituting the liquid crystal display device or performances of liquid crystal. For instance, as such defectiveness caused by a color filter, there is known defectiveness called "white non-uniformity".

So-called "white non-uniformity" is a phenomenon in which a view recognizes non-uniformity, because light transmissivity in a part of a display area does not become zero, when a voltage is applied across electrodes for displaying black. The reason why "white non-uniformity" occurs is considered that though a voltage having been applied across electrodes should be kept constant, the voltage across the electrodes drops, because a current runs through ionic materials existing in liquid crystal.

For instance, Japanese Patent Application Publications Nos. 2001-305332 and 2000-186225 have suggested a method of preventing occurrence of "white non-uniformity", based on the discovery that impurities existing in a color filter are transferred into liquid crystal.

Specifically, Japanese Patent Application Publication No. 2001-305332 has suggested a method of reducing impurities contained in pigment and resin. Resin of which a color filter making contact with a liquid crystal layer is composed is considered as one of ionic material sources, and hence, the Publication pays attention to a voltage retention rate and residual DC of liquid crystal, as characteristics relevant to display defectiveness caused by ionic material transferring to a liquid crystal layer from the resin. According to the suggested method, it is said to be possible to reduce ionic materials in a color filter, and prevent "white non-uniformity".

One of factors for reducing display quality in a liquid crystal display device including a substrate on which a color filter is formed, but no electrodes are formed, such as an in-plane switching mode liquid crystal display device, is disturbance in alignment of a liquid crystal layer, caused by an electric field leaked from a scanning line and a signal line both formed on an active device substrate.

For instance, Japanese Patent No. 3125872, and Japanese Patent Application Publications Nos. 2002-323706, 11-190860, and 11-024104 have suggested a method of shielding leaking electric field.

Specifically, in Japanese Patent No. 3125872, a common electrode is formed so as to entirely cover therewith a scanning line disposed therebelow to thereby shield an electric field leaking from the scanning line.

In Japanese Patent Application Publication No. 2002-323706, common electrodes are formed at opposite sides about a data line, or a common electrode is formed above a data line to thereby prevent an electric field from leaking into a display area.

In Japanese Patent Application Publication No. 11-190860, an electrode for shielding leaked electric field is formed in the vicinity of a scanning line to thereby shield an electric field leaking from the scanning line.

In Japanese Patent Application Publication No. 11-024104, a signal line and a scanning line are covered with a transparent common electrode to thereby shield an electric field leaking from the signal and scanning lines.

Apart from the above-mentioned "white non-uniformity", there is color non-uniformity as display defectiveness, such as "red non-uniformity" and "blue non-uniformity".

The color non-uniformity is a phenomenon in which when a light passing through one or more color layers among color layers constituting a color filter is reduced, and resultingly, a brightness of displayed color goes unbalance, and thus, displayed images are partially colored.

In particular, such color non-uniformity is likely to occur in a liquid crystal display device having an opposed substrate on which a color filter including colorants containing red, green and blue pigments at a high concentration is formed, but no electrodes are formed is.

In accordance with the analysis conducted by the inventors, such color non-uniformity is not caused by ionic materials transferring into liquid crystal. Hence, it is not possible to prevent occurrence of color non-uniformity by the above-mentioned Japanese Patent Application Publications Nos. 2001-305332 and 2000-186225.

The above-mentioned Japanese Patent No. 3125872, and Japanese Patent Application Publications Nos. 2002-323706, 11-190860, and 11-024104 are accompanied with problems as follows.

The liquid crystal display device suggested in Japanese Patent No. 3125872 is designed to include an active device substrate having TN active matrix type TFT unlike the present invention explained later, and cannot structurally have an opposed substrate on which no electrodes are formed.

In Japanese Patent Application Publication No. 2002-323706, a scanning line is not shielded, resulting in that an electric field may leak from the scanning line.

In Japanese Patent Application Publication No. 11-190860, an electrode for shielding an electric field is arranged in the vicinity of a scanning line. However, since the electrode does not overlap the scanning line, it would not be possible to completely shield an electric field to be leaked from the scanning line.

In Japanese Patent Application Publication No. 11-024104, a signal line and a scanning line are shielded with a transparent common electrode. However, since a common electrode and the transparent common electrode are formed in separate layers, it would be unavoidable for a process of fabricating an active device substrate to become complex.

In accordance with the analysis having been conducted by the inventors, it was found out that an electric field leaking from a scanning line facilitated occurrence of color non-uniformity in an in-plane switching mode liquid crystal display device including an opposed substrate on which a color filter including colorants containing red, green and blue pigments at a high concentration is formed.

As mentioned above, color non-uniformity as one of display defectiveness in a liquid crystal display device is remarkably found in an in-plane switching mode liquid crystal display device on which a color filter is formed, but no electrodes are formed.

As a result of the analysis having been conducted by the inventors with respect to the above-mentioned problem, color non-uniformity, it was found out that since a transparent electrode such as an electrode composed of indium tin oxide (ITO) was not formed on a surface of an opposed surface, facing a liquid crystal layer, an electric field leaking from a scanning line when liquid crystal was driven reached the opposed substrate having a color filter, and hence, the electric field was applied to color layers with the result that the color layers were electrically charged, causing display defectiveness.

As explained above, color non-uniformity in display defectiveness is caused when color layers constituting a color filter are electrically charged due to an electric field leaking from a scanning line and a signal line both formed on an active device substrate.

The electrically charged color layers cause alignment disturbance in a liquid crystal layer in a pixel area with the result of reduction in a brightness, and the reduction in a brightness cause unbalance in a desired brightness in a displayed color. Such brightness unbalance is recognized by a viewer as color non-uniformity.

Japanese Patent Application Publication No. 11-194366 has suggested a liquid crystal display device including a substrate, a plurality of signal lines formed on the substrate, a plurality of scanning lines formed on the substrate to intersect with the signal lines, and pixel and common electrodes formed at intersections of the signal and scanning lines and in parallel with each other.

Japanese Patent Application Publication No. 2000-89240 has suggested an IPS mode active matrix type liquid crystal display device including a common or pixel electrode entirely overlapping a gate bus line and a gate electrode both formed below the common or pixel electrode. The suggested liquid crystal display device shields an electric field radiated from the gate bus line.

SUMMARY OF THE INVENTION

In view of the above-mentioned problems in the conventional liquid crystal display devices, it is an object of the present invention to provide a liquid crystal display device having an opposed substrate on which on electrodes are formed, such as an in-plane switching mode liquid crystal display device, which is capable of preventing display defectiveness, in particular, color non-uniformity relative to a conventional liquid crystal display device, and presenting high-quality display and high reliability.

It is also an object of the present invention to provide such a liquid crystal display device without causing complexity in a process of fabricating a color filter and a thin film transistor.

Hereinbelow is described a liquid crystal display device and a method of fabricating the same in accordance with the present invention through the use of reference numerals used in later described embodiments. The reference numerals are indicated only for the purpose of clearly showing correspondence between claims and the embodiments. It should be noted that the reference numerals are not allowed to interpret of claims of the present application.

In one aspect of the present invention, there is provided a liquid crystal display device including a first substrate (31), a second substrate (33) arranged in facing relation to the first substrate (31), and a liquid crystal layer (32) sandwiched between the first and second substrates (31, 33), wherein the first substrate (31) includes a thin film transistor (30) having a gate electrode (50), a drain electrode (26) and a source electrode (27), a pixel electrode (21) associated with a pixel, a common electrode (22) to which a reference voltage is applied, a data line (29), a scanning line (24), and a common electrode line (18), the gate electrode (50), the drain electrode (26), the source electrode (27) and the common electrode (22) are electrically connected to the scanning line (24), the data line (29), the pixel electrode (21) and the common electrode line (18), respectively, the second substrate (33) is designed to include no electrodes thereon, the first substrate (31) includes an electric-field shielding layer for preventing an electric field from leaking into pixels in which images are to be displayed, from the scanning line (24), the electric-field shielding layer being comprised of an electrically conductive layer and being formed in a layer located closer to the liquid crystal layer (32) than an area in which the scanning line (24) is arranged.

The liquid crystal display device prevents occurrence of display defectiveness, in particular, color non-uniformity in comparison with a conventional liquid crystal display device.

It is preferable that the electric-field shielding layer is formed to extend such that the electric-field shielding layer overlaps the scanning line (24).

It is preferable that the electric-field shielding layer is formed to extend such that the electric-field shielding layer overlaps the scanning line (24) and the data line (29).

It is preferable that the electric-field shielding layer is formed not to overlap the thin film transistor (30).

By patterning the electric-field shielding layer not to exist just above the thin film transistor, it would be possible to prevent the thin film transistor from being harmfully influenced in operation.

It is preferable that the electric-field shielding layer is formed as a part of the common electrode (22).

By forming the electric-field shielding layer as a part of the common electrode, it is possible to shield an electric field leaking to a pixel from a scanning line without an increase in fabrication steps, enhancing cost performance.

It is preferable that the common electrode (22) including the electric-field shielding layer, and the pixel electrode (21) are formed in a common layer.

By forming the common electrode and the pixel electrode in a common layer, it is possible to fabricate the liquid crystal display device in accordance with the present invention in the smaller number of steps than steps to be carried out in a conventional method of fabricating a liquid crystal display device.

It is preferable that the electric-field shielding layer is formed separately from the common electrode (22).

It is preferable that the electric-field shielding layer is electrically connected to the common electrode line (18).

It is preferable that the electric-field shielding layer and the common and pixel electrodes (22, 21) are formed in a common layer.

It is preferable that the second substrate (33) includes a color filter (43).

By applying the present invention to a liquid crystal display device including the second substrate having a color filter containing red, green and blue colorants at a high concentration (for instance, 20% or greater, more preferably, 27% or greater), but including no electrodes, it would be possible to prevent color non-uniformity caused by a color filter being electrically charged, which was likely to occur in a conventional liquid crystal display device.

It is preferable that the color filter (43) includes red, green and blue colorants.

It is preferable that the green colorant contains a pigment at a concentration of 20% or greater, more preferably, at a concentration of 27% or greater.

It is preferable that the second substrate (33) includes a light-shielding layer comprised of a black matrix layer (36).

It is preferable that the black matrix layer (36) has a volume resistivity of $1 \times 10^9$ $\Omega \cdot cm$ or greater, more preferably, a volume resistivity of $1 \times 10^{12}$ $\Omega \cdot cm$ or greater.

There is further provided a liquid crystal display device including a first substrate (31), a second substrate (33) arranged in facing relation to the first substrate (31), and a liquid crystal layer (32) sandwiched between the first and second substrates (31, 33), wherein the first substrate (31) includes a thin film transistor (30) having a gate electrode (50), a drain electrode (26) and a source electrode (27), a pixel electrode (21) associated with a pixel, a common electrode (22) to which a reference voltage is applied, a data line (29), a scanning line (24), and a common electrode line (18), the gate electrode (50), the drain electrode (26), the source electrode (27) and the common electrode (22) are electrically connected to the scanning line (24), the data line (29), the pixel electrode (21) and the common electrode line (18), respectively, the second substrate (33) is designed to include no electrodes thereon, but include a color filter (43) and a light-shielding layer comprised of a black matrix layer (36), the color filter (43) includes red, green and blue colorants, the green colorant contains a pigment at a concentration of 20% or greater, and the black matrix layer (36) has a volume resistivity of $1 \times 10^9$ $\Omega \cdot cm$ or greater.

The liquid crystal display device prevents occurrence of display defectiveness, in particular, color non-uniformity in comparison with a conventional liquid crystal display device.

It is preferable that the black matrix layer (36) has a volume resistivity of $1 \times 10^{12}$ $\Omega \cdot cm$ or greater.

It is preferable that the green colorant contains the pigment at a concentration of 27% or greater.

It is preferable that the light-shielding layer is comprised further of a plurality of color layers (43).

It is preferable that the second substrate (33) further includes an overcoat layer (37) covering the light-shielding layer.

It is preferable that the overcoat layer (37) is comprised of an inorganic or organic film.

It is preferable that the second substrate (33) further includes a spacer (45) for ensuring a thickness of the liquid crystal layer (32).

It is preferable that the spacer (45) is comprised of an inorganic or organic film.

It is preferable that the liquid crystal display device has a chromaticity area of 65% or greater.

By designing the liquid crystal display device to have a chromaticity area of 65% or greater, it would be possible to display images in a wide chromaticity area with high display-quality.

For instance, the liquid crystal display device is comprised of an in-plane switching (IPS) mode liquid crystal display device. Specifically, the present invention is applied to a liquid crystal display device which has an active device substrate on which are formed a plurality of scanning lines, a plurality of signal lines extending perpendicularly to the scanning lines, and pixel and common electrodes alternately arranged in each of pixels defined by the scanning and signal lines, and in which a voltage is applied across the pixel and common electrodes to rotate liquid crystal molecules in parallel with the substrate.

By applying the present invention to an in-plane switching (IPS) mode liquid crystal display device, it would be possible to prevent occurrence of display defectiveness, in particular, color non-uniformity.

In another aspect of the present invention, there is provided a method of fabricating a liquid crystal display device including a first substrate (31), a second substrate (33) arranged in facing relation to the first substrate (31), and a liquid crystal layer (32) sandwiched between the first and second substrates (31, 33), wherein the first substrate (31) includes a thin film transistor (30) having a gate electrode (50), a drain electrode (26) and a source electrode (27), a pixel electrode (21) associated with a pixel, a common electrode (22) to which a reference voltage is applied, a data line (29), a scanning line (24), and a common electrode line (18), the gate electrode (50), the drain electrode (26), the source electrode (27) and the common electrode (22) are electrically connected to the scanning line (24), the data line (29), the pixel electrode (21) and the common electrode line (18), respectively, the second substrate (33) is designed to include no electrodes thereon, the method including the step of forming an electric-field shielding layer for preventing an electric field from leaking into pixels in which images are to be displayed, from the scanning line (24), the electric-field shielding layer being comprised of an electrically conductive layer and being formed in a layer located closer to the liquid crystal layer (32) than an area in which the scanning line (24) is arranged.

It is preferable that the electric-field shielding layer and the common electrode (22) are concurrently formed.

It is preferable that the electric-field shielding layer, the common electrode (22), and the pixel electrode (21) are concurrently formed.

The above and other objects and advantageous features of the present invention will be made apparent from the following description made with reference to the accompanying drawings, in which like reference characters designate the same or similar parts throughout the drawings.

DESCRIPTION OF THE PREFERRED EMBODIMENTS

Preferred embodiments in accordance with the present invention will be explained hereinbelow with reference to drawings.

In the embodiments explained hereinbelow, the present invention is applied to an in-plane switching (IPS) mode active matrix type liquid crystal display device.

First Embodiment

Figure 3:
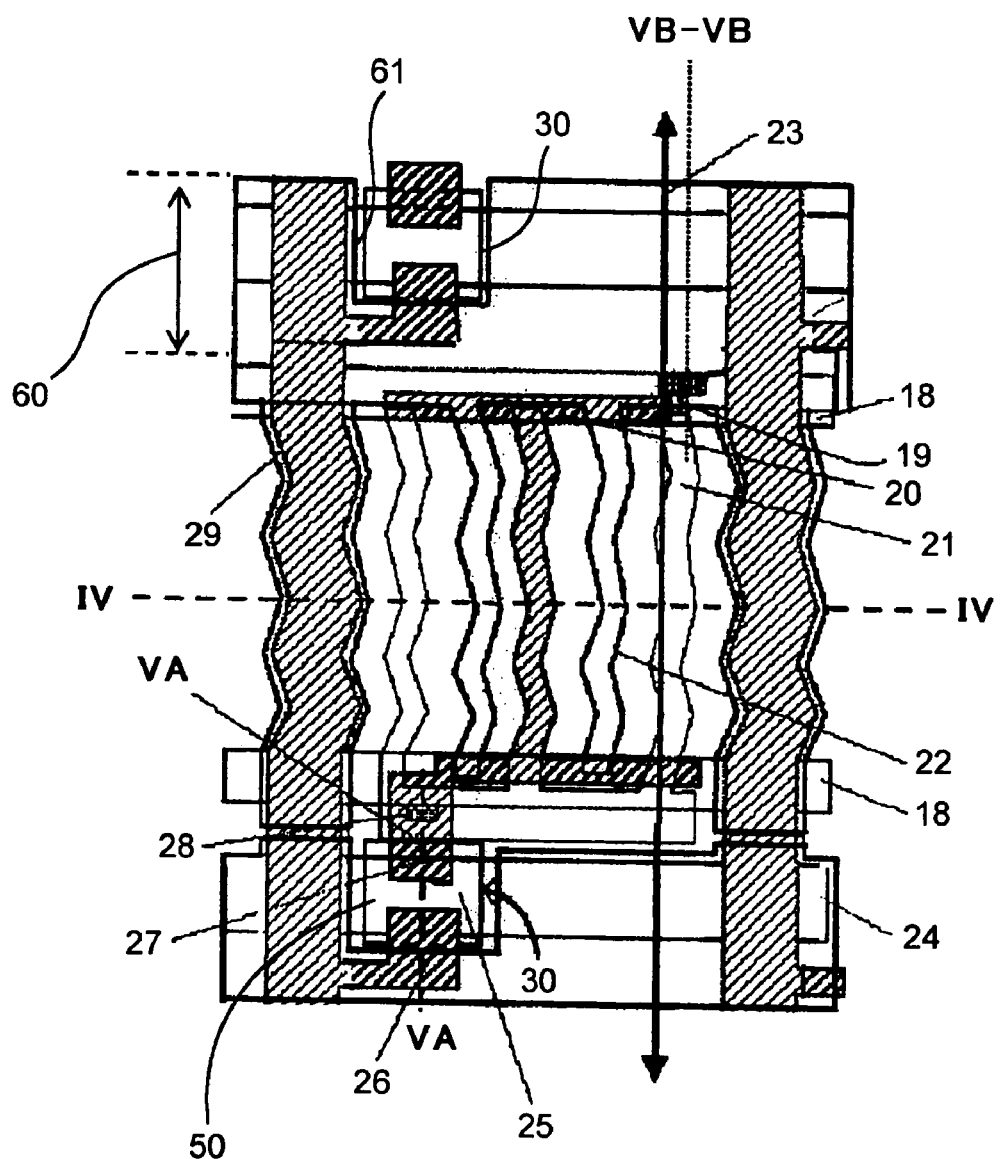
FIG. 3 is a plan view of an active device substrate in a liquid crystal display device in accordance with the first embodiment of the present invention.
Figure 4:
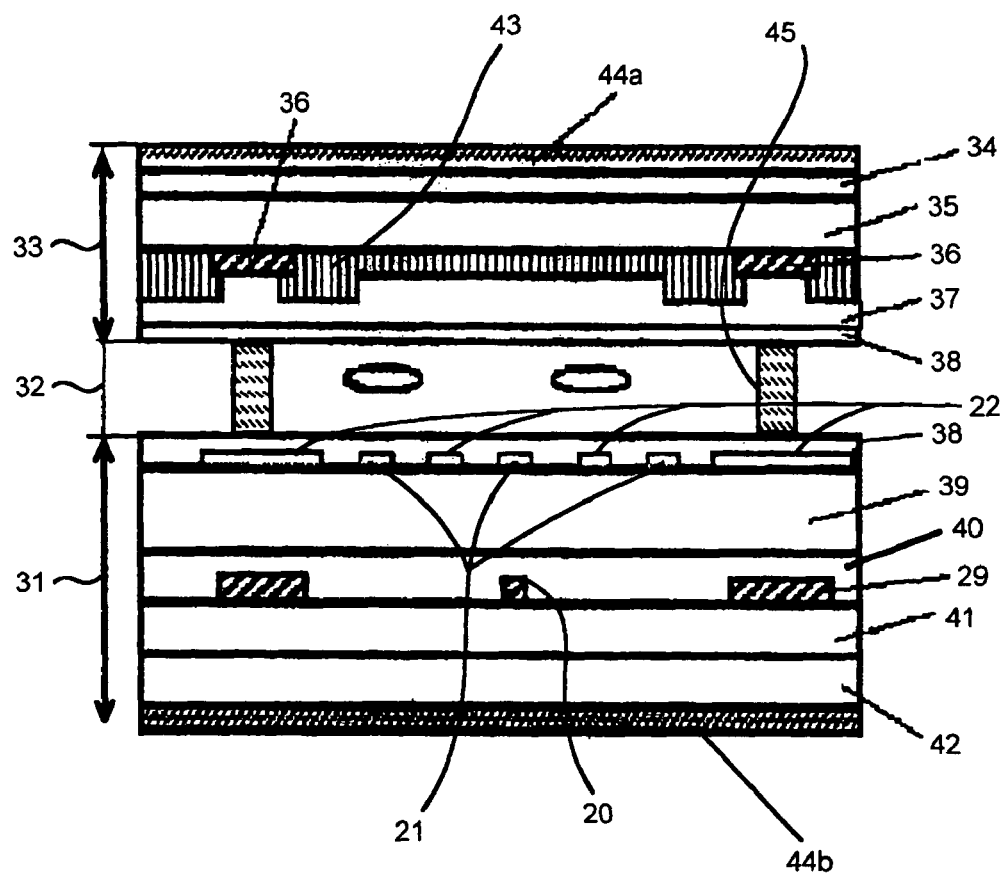
FIG. 4 is a cross-sectional view taken along the line IV-IV in FIG. 3.
Figure 5A:
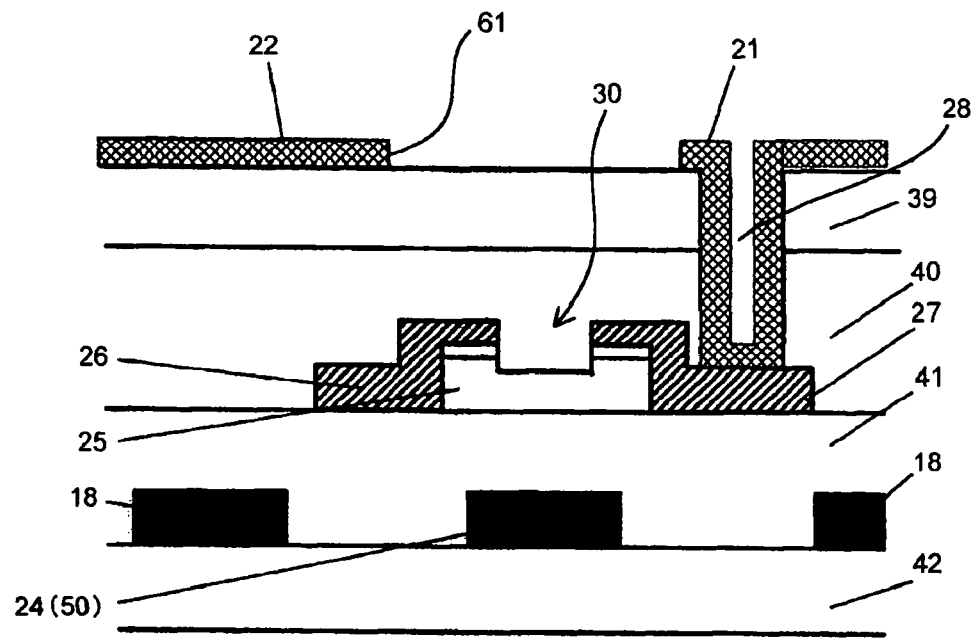
FIG. 5A is a cross-sectional view taken along the line VA-VA in FIG. 3.
Figure 5B:
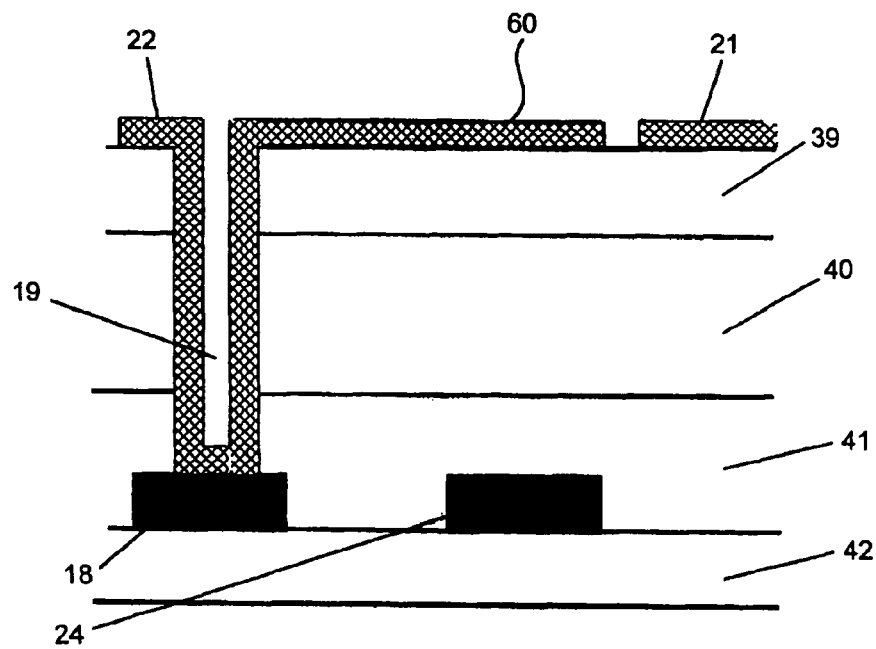
FIG. 5B is a cross-sectional view taken along the line VB-VB in FIG. 3.

FIG. 3 is a plan view of an active device substrate in a liquid crystal display device in accordance with the first embodiment of the present invention, FIG. 4 is a cross-sectional view taken along the line IV-IV in FIG. 3, FIG. 5A is a cross-sectional view taken along the line VA-VA in FIG. 3, and FIG. 5B is a cross-sectional view taken along the line VB-VB in FIG. 3.

Hereinbelow is explained the liquid crystal display device in accordance with the first embodiment with reference to FIGS. 3, 4, 5A and 5B.

As illustrated in FIG. 4, the liquid crystal display device is comprised of an active device substrate 31, an opposed substrate 33 arranged in facing relation to the active device substrate 31, and a liquid crystal layer 32 sandwiched between the active device substrate 31 and the opposed substrate 33.

The opposed substrate 33 is comprised of a second electrically insulating transparent substrate 35, a black matrix layer 36 formed on the second electrically insulating transparent substrate 35 as a light-shielding film, a color layer 43 formed on the second electrically insulating transparent substrate 35 such that they partially overlap the black matrix layer 36, an overcoat layer entirely covering the black matrix layer 36 and the color layers 43 therewith to protect them, an alignment film 38 formed on the overcoat layer 37, an electrically conductive transparent layer 34 formed on the second electrically insulating transparent substrate 35 at the opposite side about the liquid crystal layer 32, and a polarizing plate 44a formed on the electrically conductive transparent layer 34.

The overcoat layer 37 is comprised of an inorganic or organic film.

The black matrix layer 36 is formed with an opening, which defines a pixel area.

A portion of the color layer 43 overlapping the black matrix layer 36 defines a light-shielding layer together with the black matrix layer 36. The rest of the color layer 43, that is, the above-mentioned portion defining a pixel area defines an area in which colored images are displayed.

The color layer 43 is comprised of a resin layer containing a plurality of pigments such as red, green and blue pigments.

A color filter comprised of the color layer 43 may be patterned into a stripe, an island, or any other shape.

It is not always necessary for the liquid crystal display device to include the overcoat layer 37. If the liquid crystal display device is designed to display only black and white images, it is not necessary for the liquid crystal display device to include a color filter.

It is not always necessary for the opposed substrate 33 to include the electrically conductive transparent layer 34. In a liquid crystal display device, the liquid crystal layer 32 may be electrically influenced by electric charge caused by a contact of a user with a surface of a liquid crystal display panel, resulting in degradation in display quality. The electrically conductive transparent layer 34 prevents such degradation in display quality.

A color filter can be formed on the opposed substrate 33 by any process such as a printing process or a photolithography process. If high accuracy, controllability to spectral characteristic, and reproducibility are required, it is preferable to select a photolithography process. A photolithography process includes the steps of dispersing a pigment together with photoinitiator and polymerized monomer into a mixture of transparent resin and solvent to thereby have a colorant, coating the colorant onto a transparent substrate, exposing the color filter to a light in a desired pattern, and developing the color filter. These steps are repeatedly carried out for each of colors.

As illustrated in FIG. 4, the active device substrate 31 is comprised of a first electrically insulating transparent substrate 42, a first metal layer formed on the first electrically insulating transparent substrate 42 for defining a scanning line 24 (see FIG. 3), a first interlayer insulating film 41 formed on the first metal layer, an island-shaped amorphous silicon film 25 (see FIG. 3) formed on the first interlayer insulating film 41, a second metal layer formed on the first interlayer insulating film 41 for defining a data line 29, a drain electrode 26 of TFT 30, and a source electrode 27 of TFT 30, a second interlayer insulating film 40 formed on the first interlayer insulating film 41 to cover the second metal layer therewith, a third interlayer insulating film 39 formed on the second interlayer insulating film 40, a pixel electrode 21 formed on the third interlayer insulating film 39 and comprised of a transparent electrode, a common electrode 22 formed on the third interlayer insulating film 39 and comprised of a transparent electrode, an alignment film 38 formed on the third interlayer insulating film 39 to cover the pixel and common electrodes 21 and 22 therewith, and a polarizing plate 44b formed on the first electrically insulating transparent substrate 42 at the opposite side about the liquid crystal layer 32.

A portion of an electrically conductive film defining the scanning line 24 defines a gate electrode 50 (see FIG. 3) in association with TFT 30.

The second metal layer formed on the first interlayer insulating film 41 defines an auxiliary pixel electrode 20 along with the data line 29. A data signal is applied to the data line 29, a reference voltage is applied to the common electrode line 18 and the common electrode 22, and a scanning signal is applied to the scanning line 24.

TFT 30 is comprised of the gate electrode 50, the drain electrode 26 and the source electrode 27, and is disposed in the vicinity of an intersection of the scanning line 24 with the data line 29, that is, in alignment with the island-shaped amorphous silicon film 25 in each of pixels.

Since the scanning line 24 and the gate electrode 50 are comprised of the common electrically conductive film, as mentioned above, they are naturally electrically connected to each other. The drain electrode 26, the source electrode 27 and the common electrode 22 are electrically connected to the data line 29, the pixel electrode 21 and the common electrode line 18, respectively.

The pixel and common electrodes 21 and 22 are both comb-shaped. The combs of the pixel and common electrodes 21 and 22 extend in zigzag fashion in parallel with the data line 29. The combs of the pixel and common electrodes 21 and 22 are in mesh with each other, and spaced away from each other.

Since the liquid crystal display device in accordance with the first embodiment is of a multi-domain type in-plane switching (IPS) mode liquid crystal display device, the pixel electrode 21, the common electrode 22 and the data line 29 are zigzag-shaped. However, it should be noted that they may be in other forms. For instance, they may be designed to straightly extend, or to be in the wavy form.

The pixel electrode 21 comprised of a transparent electrode such as an ITO electrode is electrically connected to the source electrode 27 through a first contact hole 28, as illustrated in FIG. 5A. The common electrode 22 comprised of a transparent electrode such as an ITO electrode is electrically connected to the common electrode line 18 through a second contact hole 19, as illustrated in FIG. 5B.

The active device substrate 31 and the opposed substrate 33 includes the alignment films 38 facing each other, and are adhered to each other such that they face each other after liquid crystal in the liquid crystal layer 32 are rubbed such that liquid crystal is homogeneously aligned longitudinally of the pixel and common electrodes 21 and 22. An angle of the liquid crystal from a longitudinal direction of the pixel and common electrodes 21 and 22 is called an initial alignment direction or rubbing direction 23 of liquid crystal.

Spacers 45 are sandwiched between the active device substrate 31 and the opposed substrate 33 to maintain a thickness of the liquid crystal layer 32. Liquid crystal in the liquid crystal layer 32 is hermetically sealed between the active device substrate 31 and the opposed substrate 33 by a seal adhered to the substrates 31 and 33 around the liquid crystal layer 32. The spacers 45 are comprised of an inorganic or organic film.

In operation of an in-plane switching mode liquid crystal display device, an electric field is generated in parallel with the electrically insulating transparent substrates 35 and 42 between the pixel and common electrodes 21 and 22 in a pixel selected by a scanning signal provided through the scanning line 24 and receiving a data signal provided through the data line 29, and liquid crystal molecules are rotated in accordance with the electric field in a plane in parallel with the electrically insulating transparent substrates 35 and 42, to thereby display desired images.

Figure 1A:
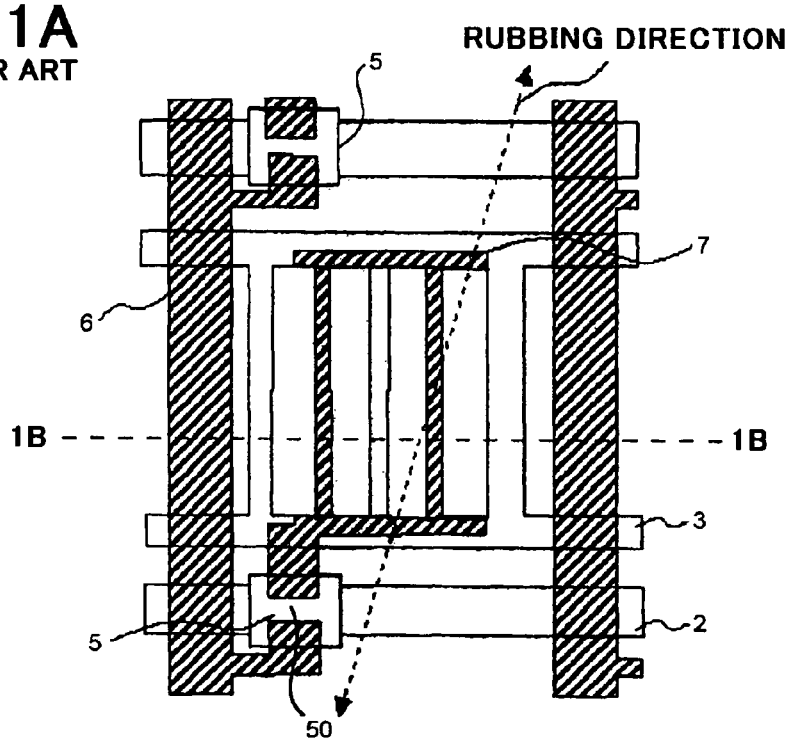
FIG. 1A is a plan view of an active device substrate in a conventional liquid crystal display device.
Figure 1B:
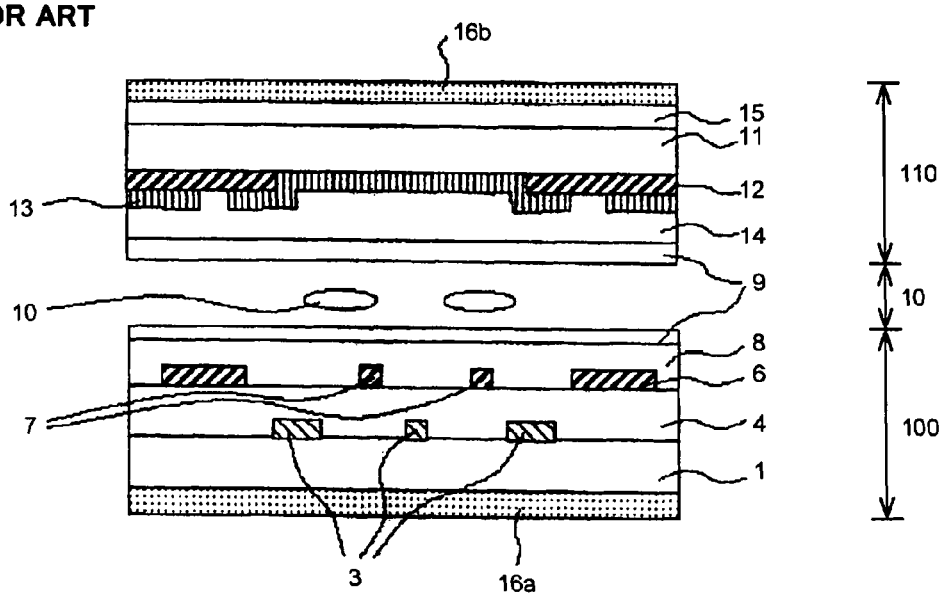
FIG. 1B is a cross-sectional view taken along the line 1B-1B in FIG. 1A.
Figure 2:
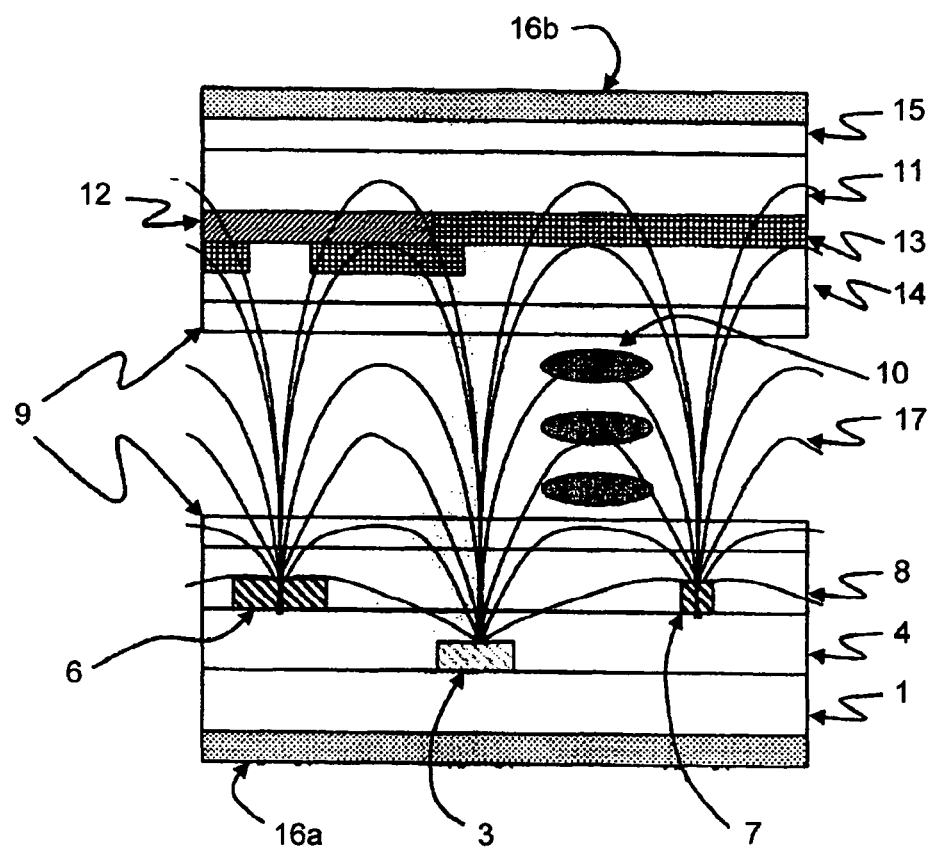
FIG. 2 is a cross-sectional view taken along the line 1B-1B in FIG. 1A, used for explaining the problem in the liquid crystal display device illustrated in FIGS. 1A and 1B.

In the conventional IPS mode liquid crystal display device, since an electric field which will drive liquid crystal molecules is generated between the pixel and common electrodes 7 and 3, an opposed electrode is not formed on the second transparent substrate 11. Hence, an electric field generated in parallel with the transparent substrates 1 and 11 for driving liquid crystal existing in the liquid crystal layer 10, and an electric field generated between the data line 6 and the common electrode 3, as defined with the electric line of force 17 in FIG. 2, both reach the color layer 13 and the black matrix layer 12 formed on the second transparent substrate 11. It is considered that the black matrix layer 12 and the color layer 13 are electrically charged by the electric fields. It is also considered that such an electric filed leaks from the scanning line 2.

The color layer 13 is composed of a colorant including resin, and pigment dispersed in the resin. A green colorant contained in a green color layer is composed mainly of green and yellow pigments and resin. As green pigment, copper halide phthalocyanine (substituted halogen is chlorine or bromine) is generally used. When an electric field is applied to copper halide phthalocyanine, it is polarized, and generates electric charges. However, since flowability of positive electric charges is different from the same of negative electric charges in a green color layer, and the color layer 13 has a high resistance, the generated electric charges are likely to be accumulated in the color layer 13. It should be noted that the fact that flowability of positive electric charges generated in the color layer 13 is different from the same of negative electric charges generated in the color layer 13 was first discovered by the inventors.

When the color layer 13 is electrically charged, an electric field is generated between the color layer 13 and the TFT substrate, and thus, an electric field generated between the pixel and common electrodes 7 and 3 would have a ruffled profile, resulting in that alignment direction of liquid crystal existing in the vicinity of the color layer 13 varies, and hence, there is generated disclination. As a result, transmissivity of the liquid crystal existing in the liquid crystal layer 10 is reduced, and thus, a wavelength of a green light is also reduced. Thus, there occurs color non-uniformity entirely in a screen, specifically, a screen entirely becomes reddish. The color layer 13 s electrically charged not only in a green color layer, but also in other color layers. However, the color layer 13 is remarkably electrically charged in a green color layer.

Accordingly, in the IPS mode liquid crystal display device in accordance with the first embodiment, as illustrated in FIGS. 3, 4, 5A and 5B, the common electrode 22 disposed closer to the liquid crystal layer 32 than the scanning line 24 is designed to overlap both of the data line 29 and the scanning line 24 with the second and third interlayer insulating films 40 and 39 being sandwiched therebetween. This ensures that an electric field is prevented from leaking from the data line 29 and the scanning line 24 into the liquid crystal layer 32.

Specifically, as illustrated in FIG. 5B, a part of the common electrode 22 overlaps the data line 29 and the scanning line 24 to define an electric-field shielding layer 60 which prevents an electric field from leaking into a pixel from the scanning line 24 and the data line 29.

As illustrated in FIGS. 4 and 5B, the electric-field shielding layer 60 is patterned to extend to exist above the scanning line 24 and the data line 29 so as to shield an electric field leaking from the scanning line 24 and the data line 29.

By shielding an electric field leaking from the scanning line 24 and the data line 29 by means of the electric-field shielding layer 60 comprised of a part of the common electrode 22, it is possible to cause the layers of the opposed substrate 33, such as the color layer 43 or the black matrix layer 36, to be less electrically charged, and to reduce or avoid alignment defectiveness such as disclination in the liquid crystal layer 32 caused by the color layer 43 and/or the black matrix layer 36 being electrically charged. Thus, display defectiveness, in particular, color non-uniformity can be prevented.

The electric-field shielding layer 60 is patterned so as not to exist just above the thin film transistor 30. Specifically, as illustrated in FIGS. 3 and 5A, the electric-field shielding layer 60 is formed with a cut-out 61 in alignment with the thin film transistor 30. The cut-out 61 prevents the thin film transistor 30 from being harmfully influenced in operation.

As explained above, the IPS mode liquid crystal display device in accordance with the first embodiment includes the electric-field shielding layer 60 overlapping the data line 29 and the scanning line 24 to thereby prevent an electric field from leaking into a pixel from the scanning line 24 and the data line 29, and hence, prevents display defectiveness, in particular, color non-uniformity.

Since the electric-field shielding layer 60 is patterned so as not to exist just above the thin film transistor 30, the thin film transistor 30 is not harmfully influenced in operation by the electric-field shielding layer 60.

Second Embodiment

Figure 6:
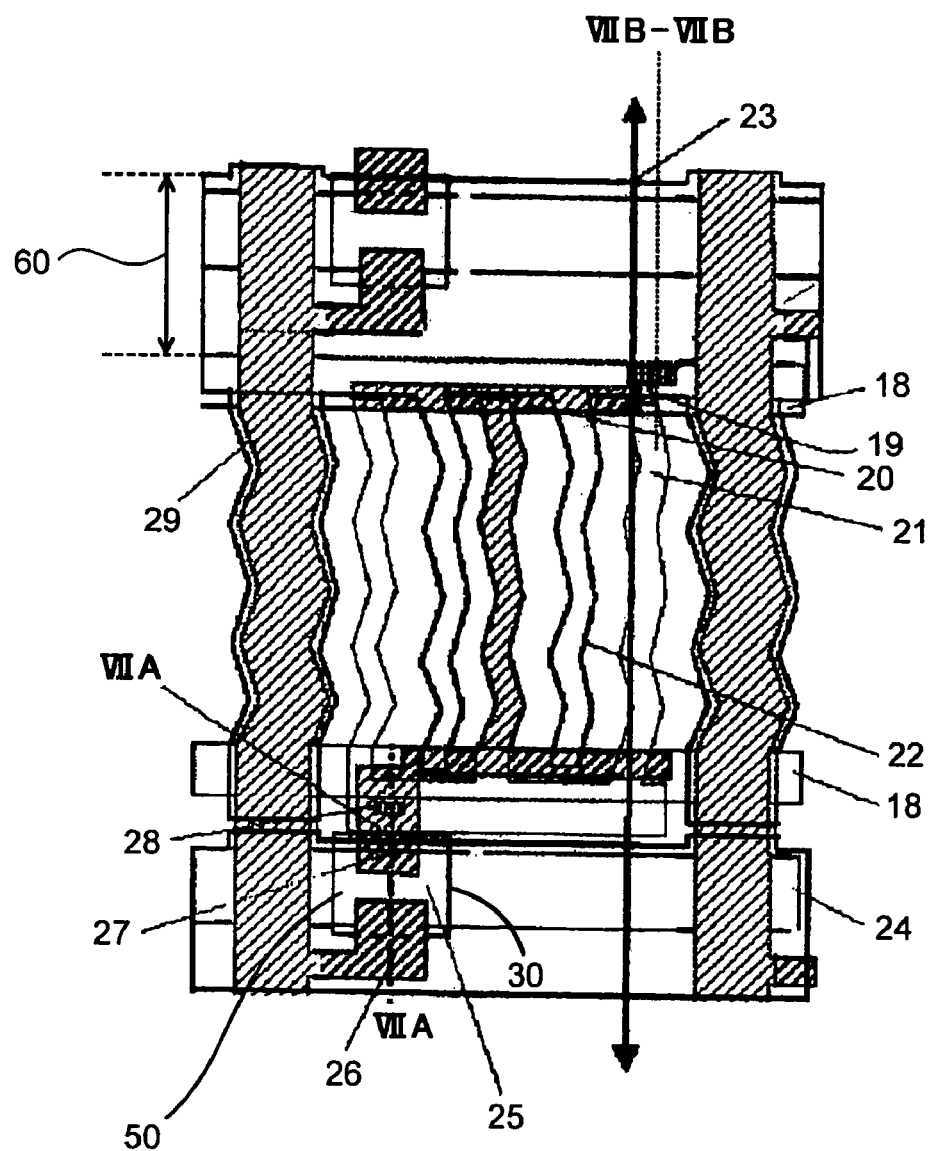
FIG. 6 is a plan view of an active device substrate in a liquid crystal display device in accordance with the second embodiment of the present invention.
Figure 7A:
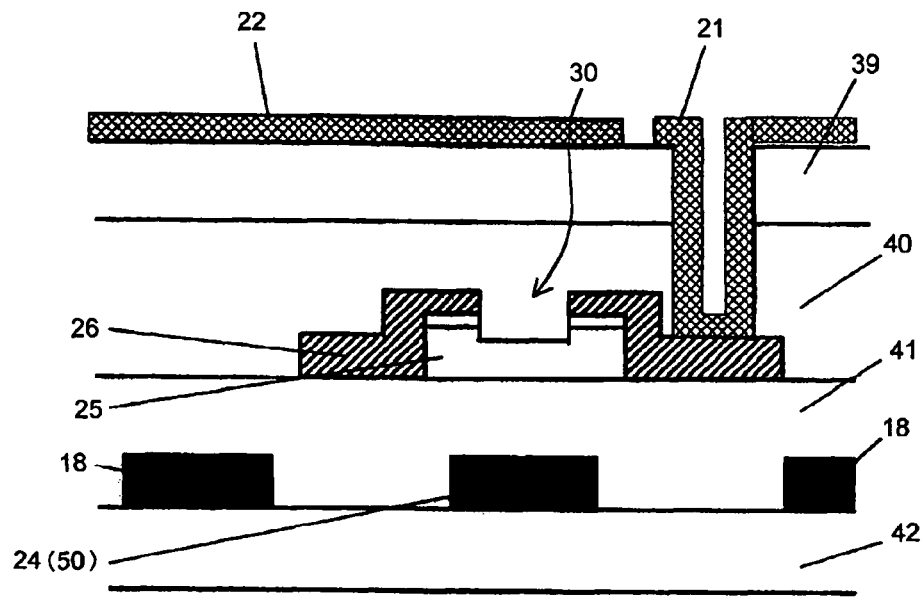
FIG. 7A is a cross-sectional view taken along the line VIIA-VIIA in FIG. 6.
Figure 7B:
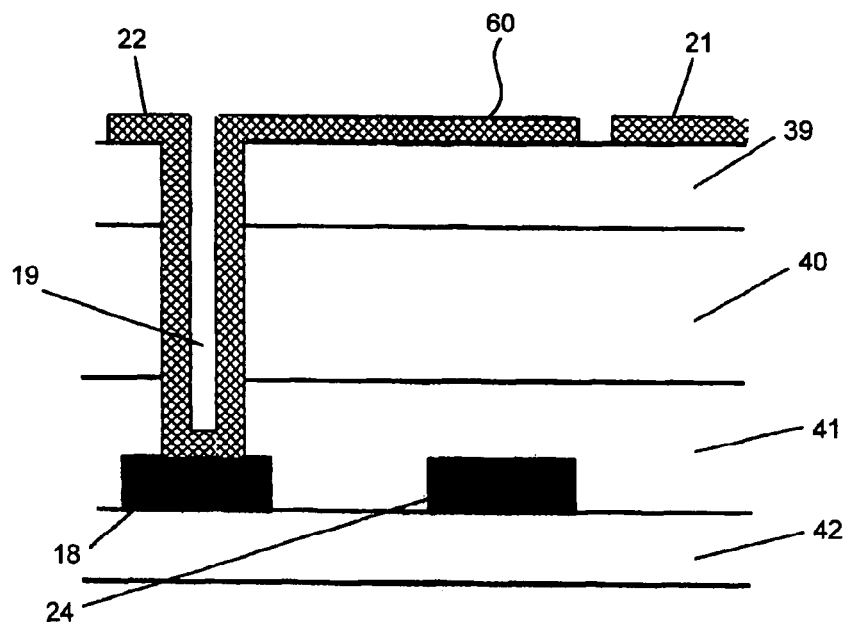
FIG. 7B is a cross-sectional view taken along the line VIIB-VIIB in FIG. 6.
Figure 8:
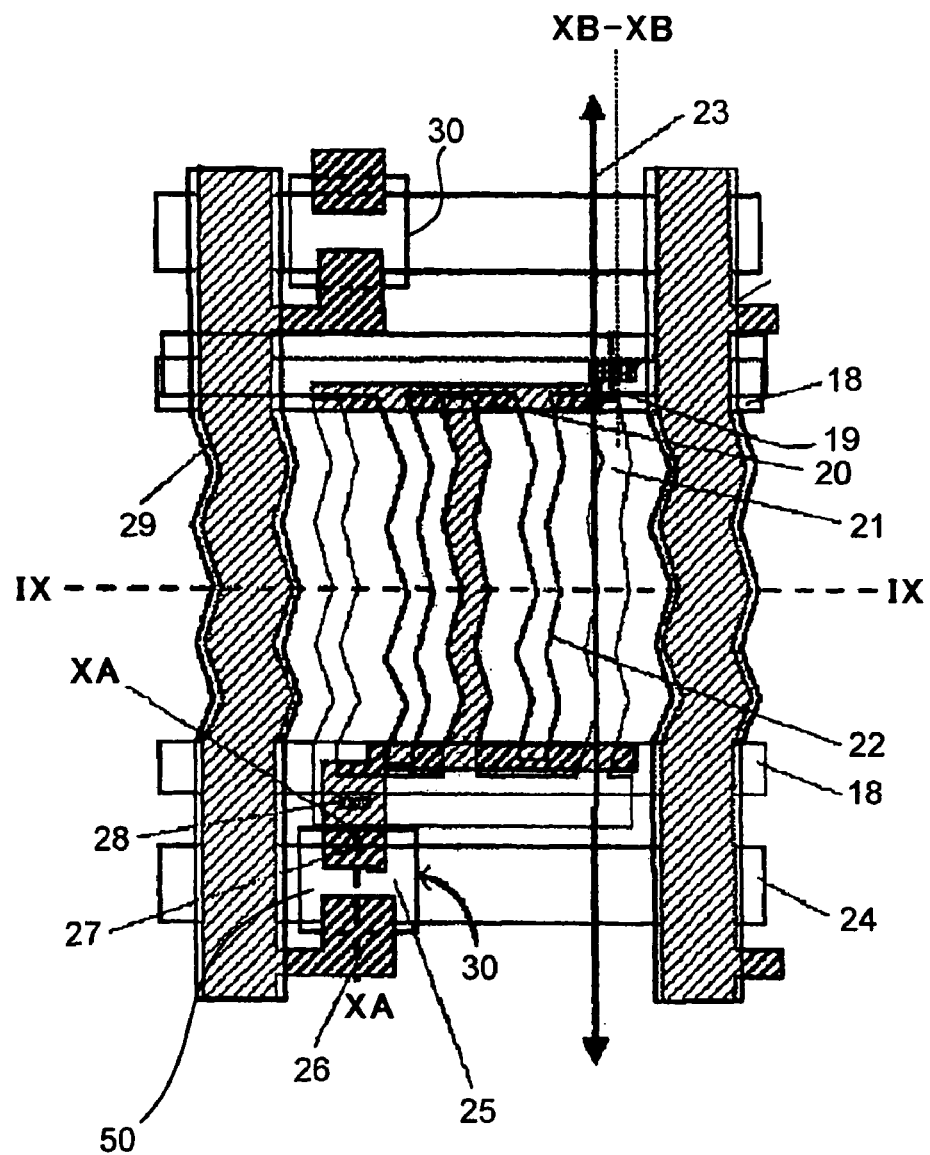
FIG. 8 is a plan view of an active device substrate in a liquid crystal display device in accordance with a reference example.
Figure 9:
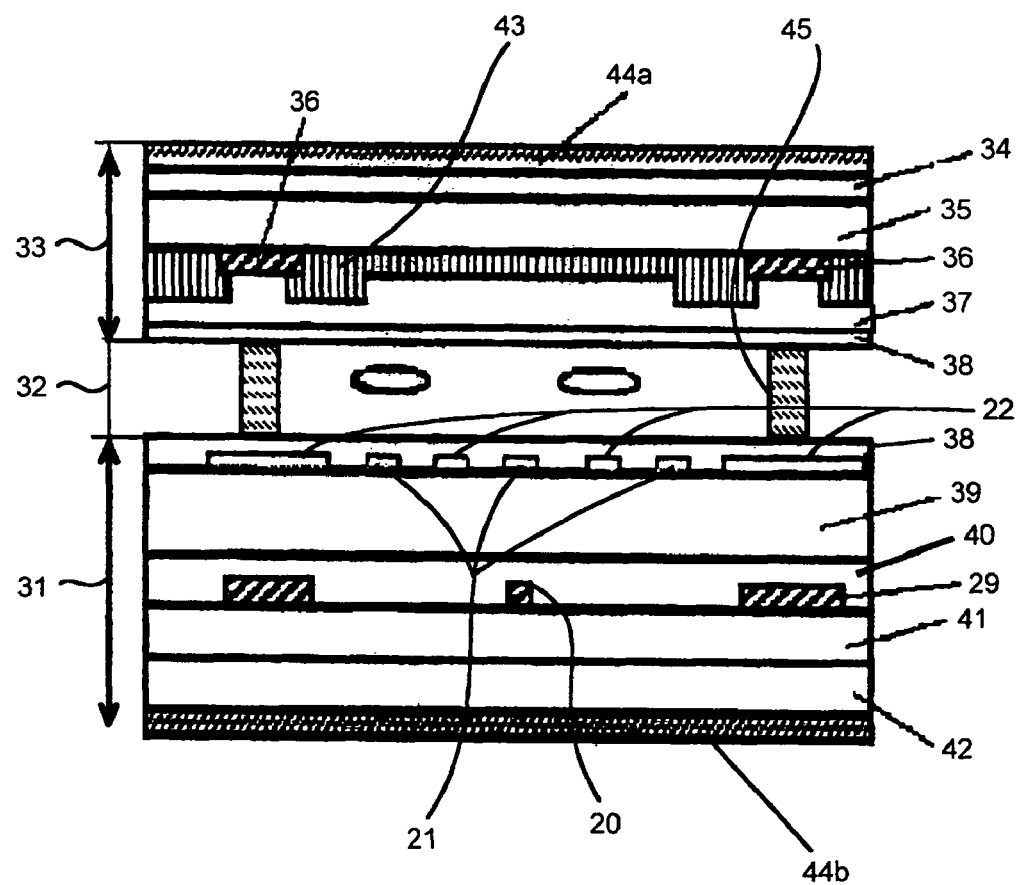
FIG. 9 is a cross-sectional view taken along the line IX-IX in FIG. 8.
Figure 10A:
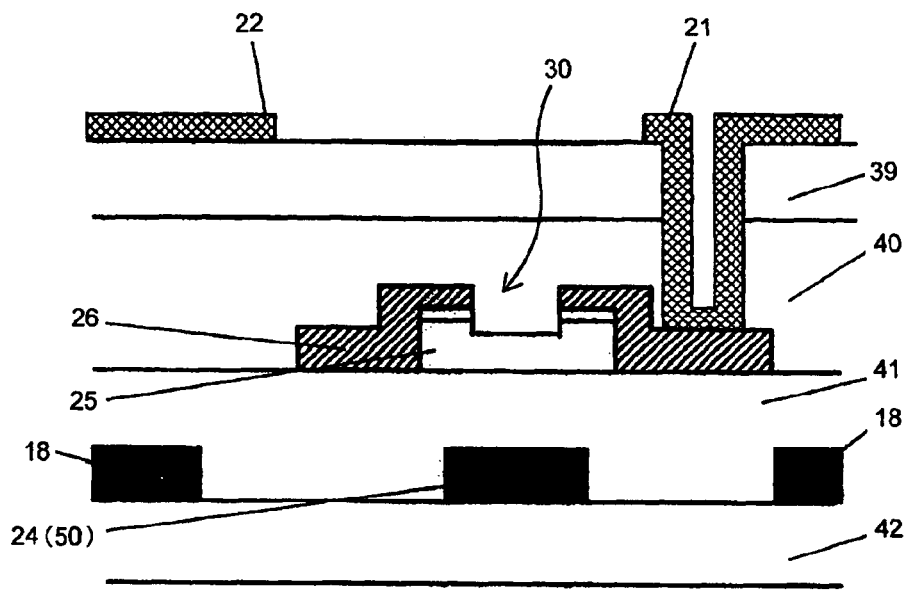
FIG. 10A is a cross-sectional view taken along the line XA-XA in FIG. 8.
Figure 10B:
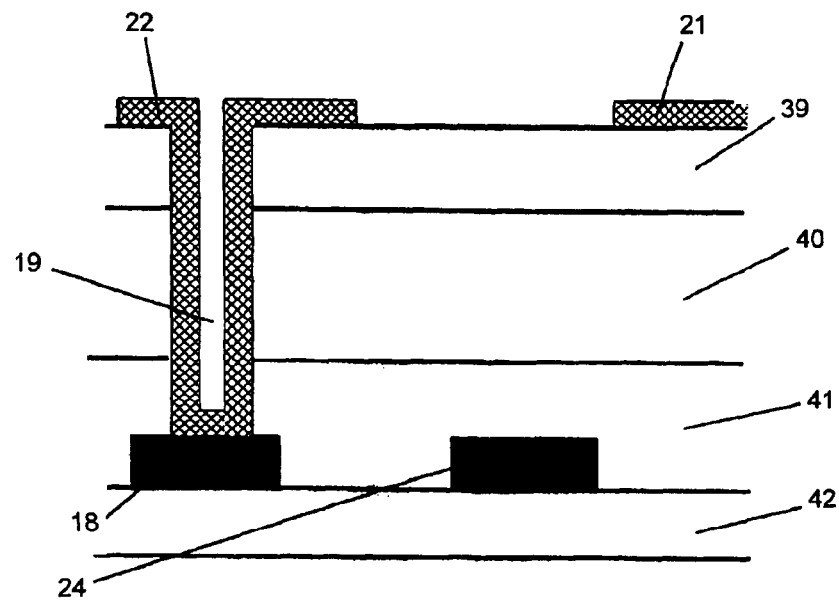
FIG. 10B is a cross-sectional view taken along the line XB-XB in FIG. 8.

FIG. 6 is a plan view of an active device substrate in a liquid crystal display device in accordance with the second embodiment, FIG. 7A is a cross-sectional view taken along the line VIIA-VIIA in FIG. 6, and FIG. 7B is a cross-sectional view taken along the line VIIB-VIIB in FIG. 6.

Hereinbelow is explained the second embodiment with reference to FIGS. 6, 7A and 7B.

As illustrated in FIGS. 6, 7A and 7B, the electric-field shielding layer 60 in the second embodiment is designed not to have a cut-out 61. Accordingly, the liquid crystal display device in accordance with the second embodiment is structurally different from the liquid crystal display device in accordance with the first embodiment only in that the electric-field shielding layer 60 overlaps the thin film transistor 30.

Parts or elements that correspond to those of the first embodiment illustrated in FIGS. 3, 4, 5A and 5B have been provided with the same reference numerals.

The liquid crystal display device in accordance with the second embodiment is designed to include the electric-field shielding layer 60 which overlaps the data line 29 and the scanning line 24 to thereby shield an electric field leaking from the scanning line 24 and the data line 29 into a pixel, and hence, can prevent display defectiveness, in particular, color non-uniformity.

Hereinbelow are explained detailed examples in accordance with the present invention.

EXAMPLE 1

Example 1 corresponds to the above-mentioned first embodiment.

Hereinbelow is explained a method of fabricating a liquid crystal display device in accordance with Example 1.

First, the active device substrate 31 is fabricated as follows.

On the first electrically insulating transparent substrate 42 is formed a chromium (Cr) film having a thickness of about 280 nm as a metal layer of which the scanning line 24 and the common electrode line 18 will be comprised later. Then, the chromium film is patterned.

On the chromium film are successively deposited the first interlayer insulating film 41 comprised of a silicon nitride film having a thickness of about 400 nm, the amorphous silicon (a-Si) film 25 having a thickness of about 200 nm, and an n-type amorphous silicon film having a thickness of about 30 nm. Then, the amorphous silicon (a-Si) film 25 and the n-type amorphous silicon film are patterned into an island.

Then, a chromium (Cr) film is formed by the thickness of about 280 nm as a second metal layer of which the auxiliary pixel electrode 20, the data line 29, the drain electrode 26 of TFT 30, and the source electrode 27 of TFT 30 will be comprised. Then, the chromium film is patterned.

On the patterned chromium film is formed the second interlayer insulating film 40 comprised of a silicon nitride film having a thickness of about 150 nm, and then, on the second interlayer insulating film 40 is formed the third interlayer insulating film 39 having a thickness of about 1.5 micrometers.

The pixel electrode 21 comprised of an ITO electrode is electrically connected to the source electrode 27 through the first contact hole 28, and the common electrode 22 comprised of an ITO electrode is electrically connected to the common electrode line 18 through the second contact hole 19. Hence, the second and third interlayer insulating films 40 and 39 are partially removed so as to form the first and second contact holes 28 and 19. Then, the pixel and common electrodes 21 and 22 are formed on the third interlayer insulating film 39 by depositing transparent metal such as ITO by the thickness of about 40 nm, and patterning the deposited transparent metal. Specifically, the pixel and common electrodes 21 and 22 are concurrently formed. Since the common electrode 22 includes the electric-field shielding layer 60, the pixel electrode 21, the common electrode 22 and the electric-field shielding layer 60 are concurrently formed.

The common electrode 22 is patterned to overlap the scanning line 24, but not to overlap the thin film transistor 30. If the common electrode 22 is patterned to overlap the thin film transistor 30, though it would be possible to prevent an electric field from harmfully influencing the thin film transistor 30, the thin film transistor 30 might by harmfully influenced in operation, when the second and third interlayer insulating films 40 and 39 are formed thinner than designed. In order to ensure safety margin with respect to an operation of the thin film transistor 30, it is preferable that the common electrode 22 is patterned not to overlap the thin film transistor 30.

The opposed substrate 33 in Example 1 is fabricated as follows.

On the second electrically insulating transparent substrate 35 is deposited resin containing carbon particles therein by the thickness of about 1.3 micrometers, to thereby form the black matrix layer 36 as a light-shielding layer. The black matrix layer 36 is comprised of a low-resistive black matrix layer so as to have a volume resistivity of about $1 \times 10^4$ Ω·cm.

On the black matrix layer 36 are coated red (R), green (G) and blue (B) colorants by a spin-coater. After the colorants have been dried in an oven, the colorants are exposed to a light through a photomask, and then, developed. Then, the developed colorants are washed with water, and post-baked, to thereby form the color layer 43. The resultant color layer 43 has a thickness of 1.9 micrometers in a red-color area, a thickness of 1.9 micrometers in a green-color area, and a thickness of 1.9 micrometers in a blue-color area.

The color layer 43 is formed such that the green colorant contains a pigment at a concentration of 20% or greater, preferably, 27% or greater. The red, green and blue color layers are arranged such that a chromaticity area is equal to or greater than 65%.

Then, resin solution is coated entirely over a resultant by means of a spin-coater, and thereafter, heated in an oven to cure. Thus, there is formed the overcoat layer 14 having a thickness of about 1.0 micrometer.

Then, resin solution is coated entirely over a resultant by means of a spin-coater, and thereafter, dried in an oven. Then, the resin is exposed to a light through a photomask, and then, developed. Then, the resin is washed with water, and post-baked, to thereby form the spacer 45. The resultant spacer 45 has a height of about 3.5 micrometers.

After coating the alignment films 38 onto the active device substrate 31 and the opposed substrate 33, the alignment films 38 are rubbed longitudinally of the pixel electrode 21. After coating sealing material onto the active device substrate 31 and the opposed substrate 33, the substrates 31 and 33 are adhered to each other through. Then, liquid crystal is introduced into a space formed between the substrates 31 and 33 to thereby form the liquid crystal layer 32.

The liquid crystal layer 32 has a cell gap of 3.5 micrometers. The polarizing plate 44b has an absorption axis extending in parallel with the rubbing direction 23, and the polarizing plate 44a has an absorption axis extending perpendicularly to the rubbing direction 23.

Then, a backlight source module is assembled to a liquid crystal display unit comprised of the active device substrate 31, the opposed substrate 33 and the liquid crystal layer 32. Furthermore, substrates through which signals and/or external power source are applied to the liquid crystal display unit are arranged on the liquid crystal display unit. Thus, there is fabricated the liquid crystal display device.

EXAMPLE 2

Example 2 corresponds to the above-mentioned second embodiment.

As illustrated in FIGS. 6, 7A and 7B, the common electrode 22 in Example 2 is patterned so as to overlap not only the scanning line 24, but also the thin film transistor 30. Except the so patterned common electrode 24, the liquid crystal display device in accordance with Example 2 is fabricated in the same way as the above-mentioned Example 1.

EXAMPLE 3

Example 3 corresponds to the above-mentioned third embodiment.

The black matrix layer 36 in Example 3 is comprised of a highly resistive black matrix layer having a volume resistivity of $1 \times 10^9$ Ω·cm or greater, preferably, a volume resistivity of $1 \times 10^{12}$ Ω·cm or greater. Except the black matrix layer 36, the liquid crystal display device in accordance with Example 3 is fabricated in the same way as the above-mentioned Example 1.

REFERENCE EXAMPLE

A liquid crystal display device in accordance with Reference Example is fabricated as follows.

The liquid crystal display device in accordance with Reference Example is structurally different from the liquid crystal display device in accordance with Example 1 only in not having the electric-field shielding layer 60.

Fabrication of the active device substrate 31 in Reference Example is explained hereinbelow with reference to FIGS. 8, 9, 10A and 10B.

On the first electrically insulating transparent substrate 42 is formed a chromium (Cr) film by the thickness of about 280 nm as a metal layer of which the scanning line 24 and the common electrode line 18 will be comprised later. Then, the chromium film is patterned to the scanning line 24 and the common electrode line 18.

On the chromium film are successively deposited the first interlayer insulating film 41 comprised of a silicon nitride film having a thickness of about 400 nm, the amorphous silicon (a-Si) film 25 having a thickness of about 200 nm, and an n-type amorphous silicon film having a thickness of about 30 nm. Then, the amorphous silicon (a-Si) film 25 and the n-type amorphous silicon film are patterned into an island.

Then, a chromium (Cr) film is formed by the thickness of about 280 nm as a second metal layer of which the auxiliary pixel electrode 20, the data line 29, the drain electrode 26 of TFT 30, and the source electrode 27 of TFT 30 will be comprised. Then, the chromium film is patterned.

On the patterned chromium film is formed, as a passivation film, the second interlayer insulating film 40 comprised of a silicon nitride film having a thickness of about 150 nm, and then, on the second interlayer insulating film 40 is formed the third interlayer insulating film 39 having a thickness of about 1.5 micrometers.

The pixel electrode 21 comprised of an ITO electrode is electrically connected to the source electrode 27 through the first contact hole 28, and the common electrode 22 comprised of an ITO electrode is electrically connected to the common electrode line 18 through the second contact hole 19. Hence, the second and third interlayer insulating films 40 and 39 are partially removed so as to form the first and second contact holes 28 and 19. Then, the pixel and common electrodes 21 and 22 are formed on the third interlayer insulating film 39 by depositing transparent metal such as ITO by the thickness of about 40 nm, and patterning the deposited transparent metal.

The common electrode 22 is patterned not to overlap the scanning line 24 and the thin film transistor 30.

The opposed substrate 33 in Reference Example is fabricated in the same as the opposed substrate 33 in Example 1.

The liquid crystal display device in accordance with Reference Example is fabricated by adhering the active device substrate 31 and the opposed substrate 33 to each other in the same way as Example 1.

The liquid crystal display devices in accordance with Examples 1, 2 and 3 and Reference Example were driven continuously for 1000 hours in a thermostatic chamber in which a temperature was 60 degrees centigrade and relative humidity was 60%, to analyze color non-uniformity in each of them.

A degree of color non-uniformity and a frequency at which disclination occurs at an opening are smaller in Examples 1 to 3 than in Reference Example. In particular, they are much smaller in Example 3 than in Reference Example.

As mentioned above, there was obtained a liquid crystal display device, among liquid crystal display devices including the opposed substrate 33 having no electrodes, which was capable of preventing display defectiveness, in particular, color non-uniformity without additionally carrying out steps in a process of fabricating the color filter 43 and/or the thin film transistor 30.

The present invention is applied to an in-plane switching (IPS) mode liquid crystal display device in the above-mentioned embodiments. However, it should be noted that the present invention may be applied to any liquid crystal display device, if it has the opposed substrate 33 including no electrodes.

The electric-field shielding layer 60 is defined by a part of the common electrode 22 in the above-mentioned first embodiment. It should be noted that the electric-field shielding layer 60 may be formed separately from the common electrode 22, in which case, it is preferable that the electric-field shielding layer 60 is electrically connected to the common electrode line 18, ensuring that an electric field is preferably shielded as mentioned above.

Even when the electric-field shielding layer 60 is formed separately from the common electrode 22, it is preferable that the electric-field shielding layer 60 is formed in the same layer as the common electrode 22 and the pixel electrode 21, that is, the electric-field shielding layer 60 is formed in the same step in which the common electrode 22 and the pixel electrode 21 are formed.

It is not necessary for the liquid crystal display device to include the electric-field shielding layer 60, if the following requirements are satisfied.

First, the opposed substrate 33 includes the color filter 43 and the black matrix layer 36 acting as a light-shielded layer.

Second, the color filter is composed of red, green and blue colorants, and the green colorant contains a pigment at 20% or greater.

Third, the black matrix layer 36 has a volume resistivity of $1\times10^9$ Ω·cm or greater, preferably, a volume resistivity of $1\times10^{12}$ Ω·cm or greater.

If the above-mentioned requirements are satisfied, the liquid crystal display device can prevent color non-uniformity, though it does not have the electric-field shielding layer 60.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Application No. 2004-051060 filed on Feb. 26, 2004 including specification, claims, drawings and summary is incorporated herein by reference in its entirety.

What is claimed is:

1. A liquid crystal display device comprising:
   a first substrate;
   a second substrate arranged in facing relation to said first substrate; and
   a liquid crystal layer sandwiched between said first and second substrates,
   wherein said first substrate includes a thin film transistor having a gate electrode, a drain electrode and a source electrode, a pixel electrode associated with a pixel, a common electrode to which a reference voltage is applied, a data line, a scanning line, and a couple of common electrode lines,
   the scanning line is located between the couple of common electrode lines in parallel with each other,
   said gate electrode, said drain electrode, said source electrode and said common electrode are electrically connected to said scanning line, said data line, said pixel electrode and said couple of common electrode lines, respectively,
   said second substrate is designed to include no electrodes thereon, but includes a color filter and a light-shielding layer comprised of a black matrix layer, said first substrate includes an electric-field shielding layer for preventing an electric field from leaking into pixels in which images are to be displayed, from said scanning line, said electric-field shielding layer is comprised of an electrically conductive layer and is formed in a layer located closer to said liquid crystal layer than an area in which said scanning line is arranged, said first substrate further includes the common electrode that is formed in such a shape that the common electrode overlaps over the data line, and is used to prevent an electric field from leaking into pixels in which images are to be displayed from the data line, wherein a narrow gap is provided between the common electrode that overlaps the data line and the electric-field shielding layer, said color filter includes red, green and blue colorants, said green colorant contains a pigment at a concentration of greater than 20 weight %, said black matrix layer has a volume resistivity of $1\times10^9$ $\Omega\cdot$cm or greater, said common and pixel electrodes are formed from a transparent electrode material on a same interlayer insulating film, the same interlayer insulating film has a flat top surface, the same interlayer insulating film, on which the common and pixel electrodes are formed, is located closer to said liquid crystal layer than an area in which said scanning line and said couple of common electrode lines are arranged and an area in which said data line is arranged, said electric-field shielding layer being comprised of an electrically conductive layer is formed from the transparent electrode material on the same interlayer insulating film, said electric-field shielding layer is located in close vicinity to one of the pixel electrodes on the same interlayer insulating film, and said liquid crystal display device has a chromaticity area of 65% or greater by NTSC ratio, which NTSC ratio is defined on the basis of NTSC standard for the chromaticity area.

2. A liquid crystal display device comprising:
a first substrate;
a second substrate arranged in facing relation to said first substrate; and
a liquid crystal layer sandwiched between said first and second substrates,
wherein said first substrate includes a thin film transistor having a gate electrode, a drain electrode and a source electrode, a pixel electrode associated with a pixel, a common electrode to which a reference voltage is applied, a data line, a scanning line, and a couple of common electrode lines, the scanning line is located between the couple of common electrode lines in parallel with each other, said gate electrode, said drain electrode, said source electrode and said common electrode are electrically connected to said scanning line, said data line, said pixel electrode and said couple of common electrode lines, respectively, said second substrate is designed to include no electrodes thereon, but includes a color filter and a light-shielding layer comprised of a black matrix layer, said first substrate includes an electric-field shielding layer for preventing an electric field from leaking into pixels in which images are to be displayed, from said scanning line, said electric-field shielding layer is comprised of an electrically conductive layer and is formed in a layer located closer to said liquid crystal layer than an area in which said scanning line is arranged, said first substrate further includes the common electrode that is formed in such a shape that the common electrode overlaps over the data line, and is used to prevent an electric field from leaking into pixels in which images are to be displayed, from the data line, wherein a narrow gap is provided between the common electrode that overlaps over the data line and the electric-field shielding layer, said color filter includes red, green and blue colorants, said green colorant contains a pigment at a concentration of greater than 27 weight %, said black matrix layer has a volume resistivity of $1\times10^9$ $\Omega\cdot$cm or greater, said common and pixel electrodes are formed from a transparent electrode material on a same interlayer insulating film, the same interlayer insulating film has a flat top surface, the same interlayer insulating film, on which the common and pixel electrodes are formed, is located closer to said liquid crystal layer than an area in which said scanning line and said couple of common electrode lines are arranged and an area in which said data line is arranged, said electric-field shielding layer being comprised of an electrically conductive layer is formed from the transparent electrode material on the same interlayer insulating film, said electric-field shielding layer is located in close vicinity to one of the pixel electrodes on the same interlayer insulating film, and said liquid crystal display device has a chromaticity area of 65% or greater by NTSC ratio, which NTSC is defined on the basis of NTSC standard for the chromaticity area.

3. The liquid crystal display device as set forth in claim 2, wherein said electric-field shielding layer is formed to extend such that said electric-field shielding layer overlaps said scanning line.

4. The liquid crystal display device as set forth in claim 2, wherein said electric-field shielding layer is formed to extend such that said electric-field shielding layer overlaps said scanning line and said data line.

5. The liquid crystal display device as set forth in claim 2, wherein said electric-field shielding layer is formed not to overlap said thin film transistor, and at least an amorphous silicon film that is comprised in the thin film transistor is entirely free from the overlapping of the electric-field shielding layer.

6. The liquid crystal display device as set forth in claim 2, wherein said electric-field shielding layer is formed as a part of said common electrode.

7. The liquid crystal display device as set forth in claim 6, wherein said common electrode including said electric-field shielding layer, and said pixel electrode are formed on the same interlayer insulating film, whereas the scanning line and the couple of common electrode lines are formed on a first electrically insulating transparent substrate.

8. The liquid crystal display device as set forth in claim 2, wherein said electric-field shielding layer is formed separately from said common electrode.

9. The liquid crystal display device as set forth in claim 8, wherein said electric-field shielding layer is electrically connected to said common electrode line.

10. The liquid crystal display device as set forth in claim 8, wherein said electric-field shielding layer and said common and pixel electrodes are formed on the same interlayer insulating film, whereas the scanning line and the couple of common electrode lines are formed on a first electrically insulating transparent substrate.

11. The liquid crystal display device as set forth in claim 2, wherein said black matrix layer has a volume resistivity of $1\times10^{12}$ Ω·cm or greater.

12. The liquid crystal display device as set forth in claim 2, wherein said second substrate further includes an overcoat layer covering said light-shielding layer.

13. The liquid crystal display device as set forth in claim 2, wherein said second substrate further includes a spacer for ensuring a thickness of said liquid crystal layer.

14. The liquid crystal display device as set forth in claim 2, wherein said liquid crystal display device is an in-plane switching liquid crystal display device.

15. The liquid crystal display device as set forth in claim 2, wherein said light-shielding layer is comprised further of a plurality of color layers.

16. A liquid crystal display device comprising:
a first substrate;
a second substrate arranged in facing relation to said first substrate; and
a liquid crystal layer sandwiched between said first and second substrates,
wherein said first substrate includes a thin film transistor having a gate electrode, a drain electrode and a source electrode, a pixel electrode associated with a pixel, a common electrode to which a reference voltage is applied, a data line, a scanning line, and a couple of common electrode lines,
the scanning line is located between the couple of common electrode lines in parallel with each other,
said gate electrode, said drain electrode, said source electrode and said common electrode are electrically connected to said scanning line, said data line, said pixel electrode and said couple of common electrode lines, respectively,
said second substrate is designed to include no electrodes thereon, but include a color filter and a light-shielding layer comprised of a black matrix layer and a plurality of color layers,
said color filter includes red, green and blue colorants,
said green colorant contains a pigment at a concentration of greater than 20 weight %,
said black matrix layer has a volume resistivity of $1\times10^9$ Ω·cm or greater,
said common and pixel electrodes are formed from a transparent electrode material on a same interlayer insulating film,
the same interlayer insulating film has a flat top surface,
the same interlayer insulating film on which the common and pixel electrodes are formed, is located closer to said liquid crystal layer than an area in which said scanning line and said couple of common electrode lines are arranged and an area in which said data line is arranged,
said first substrate further includes an electric-field shielding layer for preventing an electric field from leaking into pixels in which images are to be displayed, from said scanning line,
said electric-field shielding layer is formed from the transparent electrode material on the same interlayer insulating film,
said electric-field shielding layer is located in close vicinity to one of the pixel electrodes on the same interlayer insulating film,
said first substrate further includes the common electrode that is formed in such a shape that the common electrode overlaps over the data line, and is used to prevent an electric field from leaking into pixels in which images are to be displayed, from the data line, wherein a narrow gap is provided between the common electrode that overlaps over the data line and the electric-field shielding layer, and
said liquid crystal display device has a chromaticity area of 65% or greater by NTSC ratio, which NTSC ratio is defined on the basis of NTSC standard for the chromaticity area.

17. The liquid crystal display device comprising:
a first substrate;
a second substrate arranged in facing relation to said first substrate; and
a liquid crystal layer sandwiched between said first and second substrates,
wherein said first substrate includes a thin film transistor having a gate electrode, a drain electrode and a source electrode, a pixel electrode associated with a pixel, a common electrode to which a reference voltage is applied, a data line, a scanning line, and a couple of common electrode lines,
the scanning line is located between the couple of common electrode lines in parallel with each other,
said gate electrode, said drain electrode, said source electrode and said common electrode are electrically connected to said scanning line, said data line, said pixel electrode and said couple of common electrode lines, respectively,
said second substrate is designed to include no electrodes thereon, but include a color filter and a light-shielding layer comprised of a black matrix layer and a plurality of color layers,
said color filter includes red, green and blue colorants,
said green colorant contains said pigment at a concentration of greater than 27 weight %,
said black matrix layer has a volume resistivity of $1\times10^9$ Ω·cm or greater,
said common and pixel electrodes are formed from a transparent electrode material on a same interlayer insulating film,
the same interlayer insulating film has a flat top surface,
the same interlayer insulating film, on which the common and pixel electrodes are formed, is located closer to said liquid crystal layer than an area in which said scanning line and said couple of common electrode lines are arranged and an area in which said data line is arranged,
said first substrate further includes an electric-field shielding layer for preventing an electric field from leaking into pixels in which images are to be displayed, from said scanning line,
said electric-field shielding layer is formed from the transparent electrode material on the same interlayer insulating film,
said electric-field shielding layer is located in close vicinity to one of the pixel electrodes on the same interlayer insulating film,
said first substrate further includes the common electrode that is formed in such a shape that the common electrode overlaps over the data line, and is used to prevent an electric field from leaking into pixels in which images are to be displayed, from the data line, wherein a narrow gap is provided between the common electrode that overlaps over the data line and the electric-field shielding layer, and said liquid crystal display device has a chromaticity area of 65% or greater by NTSC ratio, which NTSC ratio is defined on the basis of NTSC standard for the chromaticity area.

18. The liquid crystal display device as set forth in claim 17, wherein said black matrix layer has a volume resistivity of $1\times10^{12}$ Ω·cm or greater.

19. The liquid crystal display device as set forth in claim 17, wherein said second substrate further includes an overcoat layer covering said light-shielding layer.

20. The liquid crystal display device as set forth in claim 19, wherein said overcoat layer is comprised of an inorganic or organic film.

21. The liquid crystal display device as set forth in claim 17, wherein said second substrate further includes a spacer for ensuring a thickness of said liquid crystal layer.

22. The liquid crystal display device as set forth in claim 21, wherein said spacer is comprised of an inorganic or organic film.

23. The liquid crystal display device as set forth in claim 17, wherein said liquid crystal display device is an in-plane switching liquid crystal display device.

24. The liquid crystal display device as set forth in claim 17,
wherein said electric-field shielding layer is formed not to overlap said thin film transistor, and at least an amorphous silicon film that is comprised in the thin film transistor is entirely free from the overlapping of the electric-field shielding layer.

* * * * *